United States Patent [19]

Ito et al.

[11] Patent Number: 5,676,725
[45] Date of Patent: Oct. 14, 1997

[54] METHOD OF MANUFACTURING SINGLE-MODE OPTICAL FIBER

[75] Inventors: Masumi Ito; Sumio Hoshino; Toshio Danzuka, all of Yokohama, Japan

[73] Assignee: Sumitomo Electric Industries Ltd, Osaka, Japan

[21] Appl. No.: 623,736

[22] Filed: Mar. 29, 1996

Related U.S. Application Data

[63] Continuation of Ser. No. 261,960, Jun. 17, 1994, abandoned.

[30] Foreign Application Priority Data

Jun. 18, 1993 [JP] Japan ................................ 5-147209

[51] Int. Cl.⁶ .................... C03B 37/018; C03B 37/07
[52] U.S. Cl. ...................... 65/382; 65/399; 65/414; 65/415; 65/421; 65/423
[58] Field of Search ............... 65/382, 385, 399, 65/414, 415, 421, 423, 427, 428, 430

[56] References Cited

U.S. PATENT DOCUMENTS

| | | | |
|---|---|---|---|
| 4,627,867 | 12/1986 | Tanaka et al. | 65/421 |
| 4,944,783 | 7/1990 | Hongo et al. | |

FOREIGN PATENT DOCUMENTS

| | | |
|---|---|---|
| 0311080 | 4/1989 | European Pat. Off. |
| 55-154336 | 12/1980 | Japan |
| 61-291432 | 12/1986 | Japan |
| 63-74931 | 4/1988 | Japan |
| 2214506 | 9/1989 | United Kingdom |

OTHER PUBLICATIONS

Patent Abstracts of Japan, vol. 12, No. 37 (C-473) Feb. 4, 1988 & JP-A-62 187133 (Nippon Telegr & Teleph Corp) Aug. 15, 1987.
Patent Abstracts of Japan, vol. 8, No. 193 (C-241) Sep. 5, 1984 & JP-A-59 083953 (Nihon ITA Glass KK) May 15, 1984.
Patent Abstracts of Japan, vol. 10, No. 362 (C-389) Dec. 4, 1986 & JP-A-61 158836 (Furukawa Electric Co Ltd) Jul. 18, 1986.
Patent Abstracts of Japan, vol. 18, No. 111 (C-1170) Feb. 23, 1994 & JP-A-05 306137 (Fujikura Ltd) Nov. 19, 1993.
Patent Abstracts of Japan, vol. 13, No. 3 (C-557) Jan. 6, 1989 & JP-A-63 215530 (Mitsubishi Cable Ind Ltd) Sep. 8, 1988.
Patent Abstracts of Japan, vol. 9, No. 130 (C-284) Jun. 5, 1985 & JP-A-60 016826 (Furukawa Denki Kogyo KK et al) Jan. 28, 1985.
Patent Abstracts of Japan, vol. 7, No. 91 (C-162) Apr. 15, 1983 & JP-A-58 020744 (Nippon Denshin Denwa Kosha et al) Feb. 7, 1983.
Patent Abstracts of Japan, vol. 12, No. 301 (C-521) Aug. 16, 1988 & JP-A-63 074931 (Sumitomo Electric Ind Ltd) Apr. 5, 1988.

*Primary Examiner*—Melvin Mayes
*Attorney, Agent, or Firm*—Cushman Darby & Cushman Intellectual Property Group of Pillsbury Madison & Sutro, LLP

[57] ABSTRACT

A method of manufacturing an optical fiber in which the deviation of a cutoff wavelength from a design value can be minimized. It is found that, upon diameter reduction of a porous core glass body by heat treatment, when the diameter reduction ratio is set to a value larger than 0.90, a "spike" in the refractive index distribution curve of a core can be prevented, and the deviation of the cutoff wavelength from the design value can be minimized. Therefore, there is provided a method comprising the first step of depositing fine $SiO_2$ particles and fine $GeO_2$ particles, which are produced by a core formation burner, to grow a porous core glass body from a distal end of a rotating starting rod in an axial direction, the second step of performing diameter reduction by heating the grown porous core glass body by heating means while growing the porous core glass body, and the third step of depositing fine $SiO_2$ particles produced by a cladding formation burner to form a porous cladding glass layer on an outer surface of the diameter-reduced porous core glass body while performing growing and diameter reduction of the porous core glass body, wherein an outer diameter of the porous core glass body after the third step of depositing is larger than 0.90 times an outer diameter before diameter reduction.

4 Claims, 10 Drawing Sheets

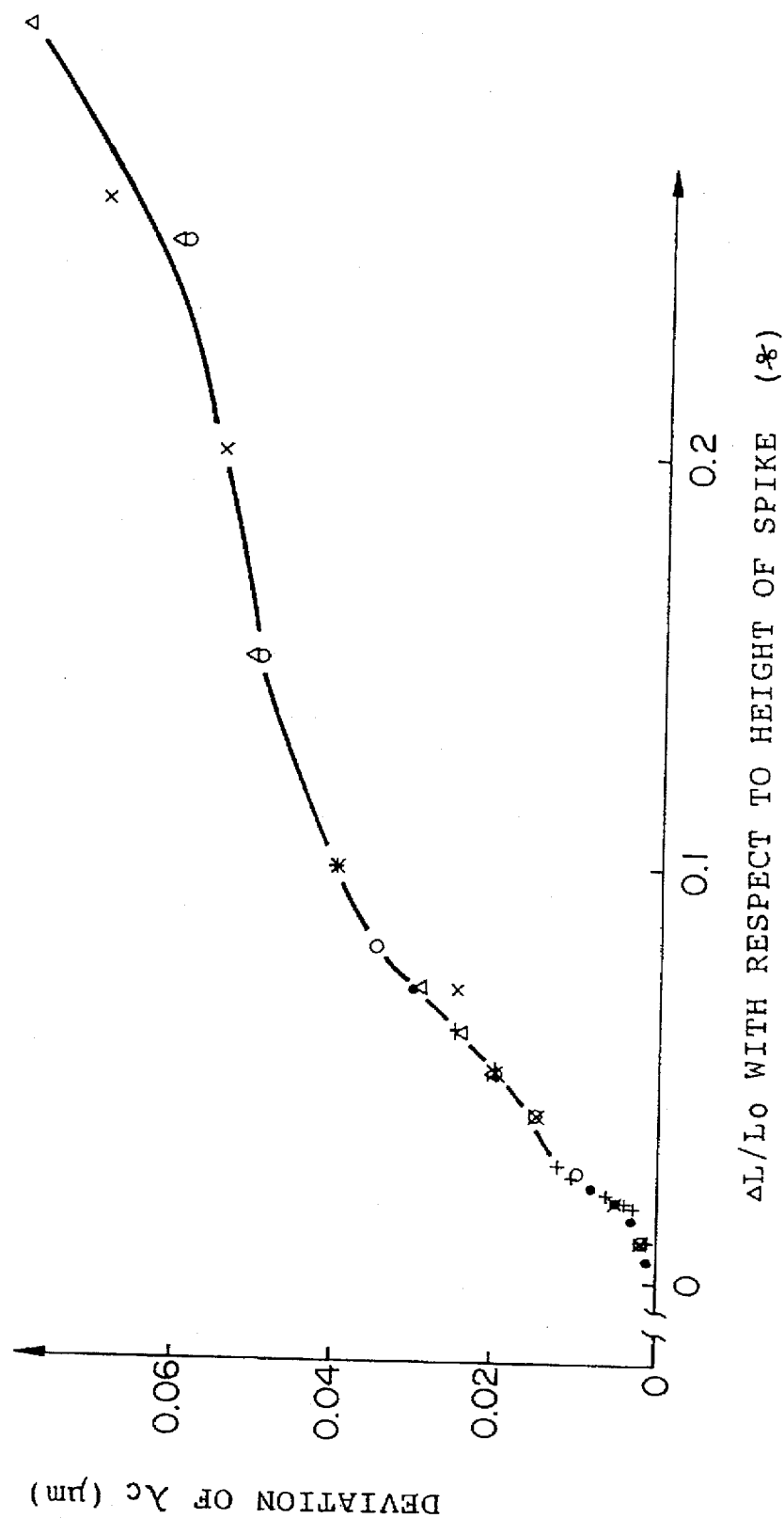

METHOD OF MANUFACTURING SINGLE-MODE OPTICAL FIBER

This is a continuation of application Ser. No. 08/261,96, filed on Jun. 17, 1994, which was abandoned.

BACKGROUND OF THE INVENTION

1. Field of the Invention

The present invention relates to a method of manufacturing a single-mode optical fiber preform and, more particularly, to a method used to manufacture a glass preform constituted by a core material consisting of $SiO_2$ containing $GeO_2$ and a cladding material consisting of high-purity $SiO_2$.

2. Related Background Art

According to a known method of manufacturing a single-mode optical fiber preform, fine particles of $GeO_2$ and $SiO_2$ are produced by a core burner while fine $SiO_2$ particles are produced by a cladding burner, and a porous cladding glass layer is formed, by the cladding burner, on the surface of a porous core glass body formed by the core burner. Techniques disclosed in Japanese Patent Laid-Open Nos. 63-74931 and 1-153548 (corresponding to U.S. Pat. No. 4,944,783) are known to obtain a graded index core portion in a transparent glass preform obtained by vitrifying the completed porous preform or an optical fiber obtained by spinning the transparent glass preform.

According to the techniques in these applications, when a porous core glass body is formed into a rod by oxy-hydrogen flame, and a porous cladding glass layer is deposited on the outer surface of the rod-like porous core glass body by the oxy-hydrogen flame, the forepart of a portion where the porous cladding glass layer is deposited, i.e., the surface of the porous core glass body between the deposition position of fine cladding particles and the deposition position of fine core particles is heated to reduce the diameter. The above-mentioned U.S. Patent discloses that, with this method, $GeO_2$ in the porous core glass body is prevented from moving into the porous cladding glass layer when the preform is vitrified, thereby achieving the graded index distribution between the core and the cladding.

In a single-mode optical fiber, so-called dispersion characteristics are required to be good. "Dispersion" means that the waveform of a light pulse expands with time while the light pulse propagates in the optical fiber. In an ideal single-mode optical fiber, so-called mode dispersion becomes zero. For this reason, it is important to obtain a graded index core.

On the other hand, a cutoff wavelength $\lambda c$ of the optical fiber is a wavelength at the boundary where the single-mode optical fiber changes to a multi-mode optical fiber. The cutoff wavelength is a value inherent to an optical fiber. If an optical fiber is a single-mode optical fiber with respect to a wavelength $\lambda_1$ of signal light to be propagated, the wavelength $\lambda_1$ of the signal light must be longer than the cutoff wavelength $\lambda c$.

Therefore, when an optical fiber is to be manufactured, the structure manufacturing process of a porous preform is designed to obtain the specification value of the cutoff wavelength of an optical fiber upon vitrifying and spinning the porous preform.

As described in the above applications, the diameter of the porous core glass body is effectively reduced, and the porous cladding glass layer is effectively formed on the outer surface to obtain the graded index core. In addition, it is necessary to set the cutoff wavelength $\lambda c$ of the optical fiber as the design value or a value near the design value when the diameter of the porous core glass body is reduced, and the porous cladding glass layer is to be formed on the outer surface of the core. This is particularly important in the narrow range of allowable values with respect to deviations from the design value of the transmission characteristics of the optical fiber, i.e., in fabrication of an optical fiber which requires strict specifications. However, the conditions of the preform manufacturing process have not been discussed yet in association with this point.

SUMMARY OF THE INVENTION

The present invention has been made on the basis of the above-described situation as a result of extensive studies and experiments by the present inventors. According to the experimental examination by the present inventors, it is found that, upon diameter reduction of the porous core glass body by heat treatment, when the diameter reduction ratio is set to a value larger than 0.90, a "spike" in the refractive index distribution curve of the core can be prevented, and a deviation of the cutoff wavelength $\lambda c$ from the design value can be minimized.

Therefore, according to the present invention, there is provided a method of manufacturing a single-mode optical fiber preform comprising, the first step of depositing fine $SiO_2$ particles and fine $GeO_2$ particles to grow a porous core glass body from a distal end of a rotating starting rod in an axial direction by using a core formation burner, the second step of heating said grown porous core by heating means to perform diameter reduction while growing said porous core glass body, and the third step of depositing fine $SiO_2$ particles produced to form a porous cladding glass layer on an outer surface of said diameter-reduced porous core glass body by a cladding formation burner while performing growing and diameter reduction of said porous core glass body, wherein an outer diameter of said porous core glass body after the third step of depositing is larger than 0.90 times an outer diameter before diameter reduction.

As the heating means, a burner, provided between the core formation burner and the cladding formation burner, for heating the porous core glass body by an oxy-hydrogen flame may be used. As the heating means for performing diameter reduction, a radiant heater such as a ceramic heater or a heater using optical radiation may be used. However, an oxy-hydrogen burner provided in addition to the core formation burner and the cladding formation burner is most preferable. This is because the degree of heat treatment can be controlled by increasing/decreasing the flow rate of hydrogen, moving/retreating the burner toward/from the porous glass body, or changing the size of the flame hole of the burner to adjust the diameter reduction ratio to a predetermined value. Even when the oxy-hydrogen flame from the cladding formation burner contains a lot of fine glass particles at the central portion and few fine glass particles at the peripheral portion, the diameter reduction ratio can be controlled as in the present invention.

In addition, when the outer diameter of the porous core glass body after the second step of performing diameter reduction is not more than 0.98 times the outer diameter before diameter reduction, the graded index core can be obtained to prevent dispersion while minimizing the deviation of the cutoff wavelength from the design value.

Furthermore, it is preferable that the first step includes the step of measuring the outer diameter of the porous core glass body before diameter reduction while growing the porous core glass body, the second step includes the step of measuring the outer diameter of the diameter-reduced porous core glass body while performing diameter reduction of the porous core glass body, and heat treatment by the heating means is controlled such that the measured outer diameter after diameter reduction is larger than 0.90 times the outer diameter before diameter reduction. In this case, the diameter reduction ratio can be obtained in real time to control the degree of heat treatment. Therefore, even when a long porous preform is to be manufactured, uniform quality can be ensured from the upper end to the lower end of the preform. For this reason, a very long optical fiber for long-distance optical communication having uniform quality can be manufactured.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 13 is a graph showing the correlation between the deviation of the cutoff wavelength and the height of the spike.

DETAILED DESCRIPTION OF THE PREFERRED EMBODIMENT

Figure 1:
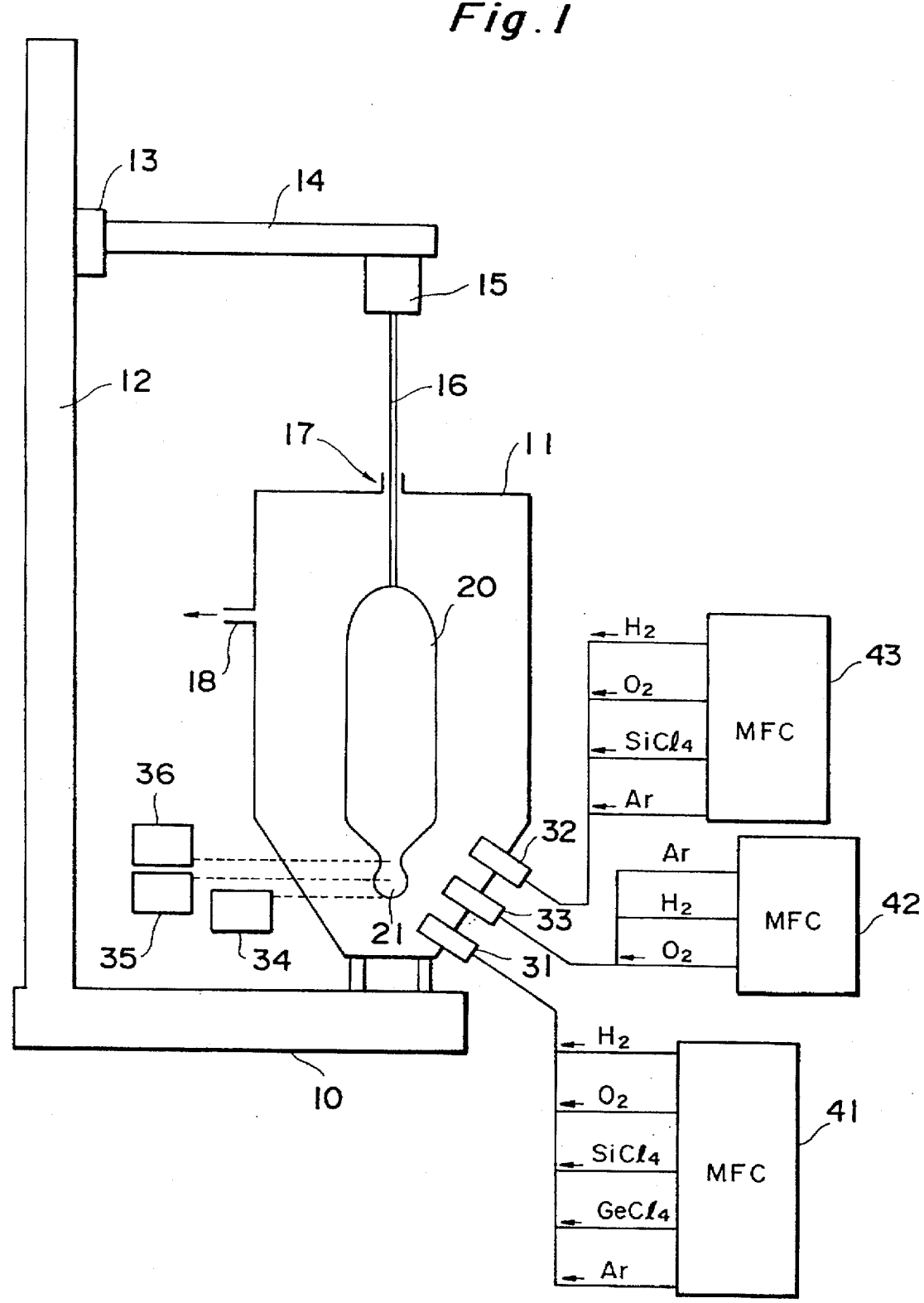
FIG. 1 is a view showing the entire arrangement of an apparatus to which a method according to an embodiment is applied.

An embodiment of the present invention will be described below with reference to the accompanying drawings. The same reference numerals and symbols throughout the drawings denote the same elements, and a detailed description thereof will be omitted.

FIG. 1 is a view showing the entire arrangement of a porous preform manufacturing apparatus to which a method according to an embodiment is applied. A muffle 11 consisting of an SUS metal is mounted on a base 10, and a column 12 stands upward from the base 10 next to the muffle 11. A support bar 14 is provided to the column 12 through an elevating device 13. A quartz seed rod 16 is vertically fixed to the support bar 14 through a rotating device 15. A porous fiber preform 20 is grown in the muffle 11 from the distal end of the seed rod 16 in the vertical direction, i.e., the axial direction of the seed rod 16 rotated by the rotating device 15.

The muffle 11 has an insertion opening 17 for the seed rod 16 and an exhaust port 18. An auxiliary heating burner 33 is provided to the muffle 11 in addition to a core formation burner 31 and a cladding formation burner 32. The muffle 11 also has a distal end detector 34, a maximum diameter measurement device 35, and a minimum diameter measurement device 36. The distal end detector 34 radiates a laser beam on the lower end of the porous fiber preform 20 and receives the light on the opposite side, thereby detecting the distal end of the porous fiber preform 20. The maximum diameter measurement device 35 radiates a laser beam on the porous fiber preform 20 to measure the maximum outer diameter, i.e., an outer diameter D of a porous core glass body 21 near the distal end of the porous fiber preform 20 before diameter reduction. The minimum diameter measurement device 36 similarly measures the minimum outer diameter, i.e., an outer diameter d of the porous core glass body 21 after diameter reduction.

The core formation burner 31, the cladding formation burner 32, and the auxiliary heating burner 33 are connected to mass flow controllers (MFCs) 41 to 43, respectively, through pipelines. Tanks (none are shown) of Ar (argon) serving as a carrier gas, $O_2$ (oxygen) and $H_2$ (hydrogen) serving as a flame generation gas, and $SiCl_4$ (tetrachlorosilane) and $GeCl_4$ (germanium tetrachloride) serving as a source gas are connected to the MFCs 41 to 43.

Figure 2:
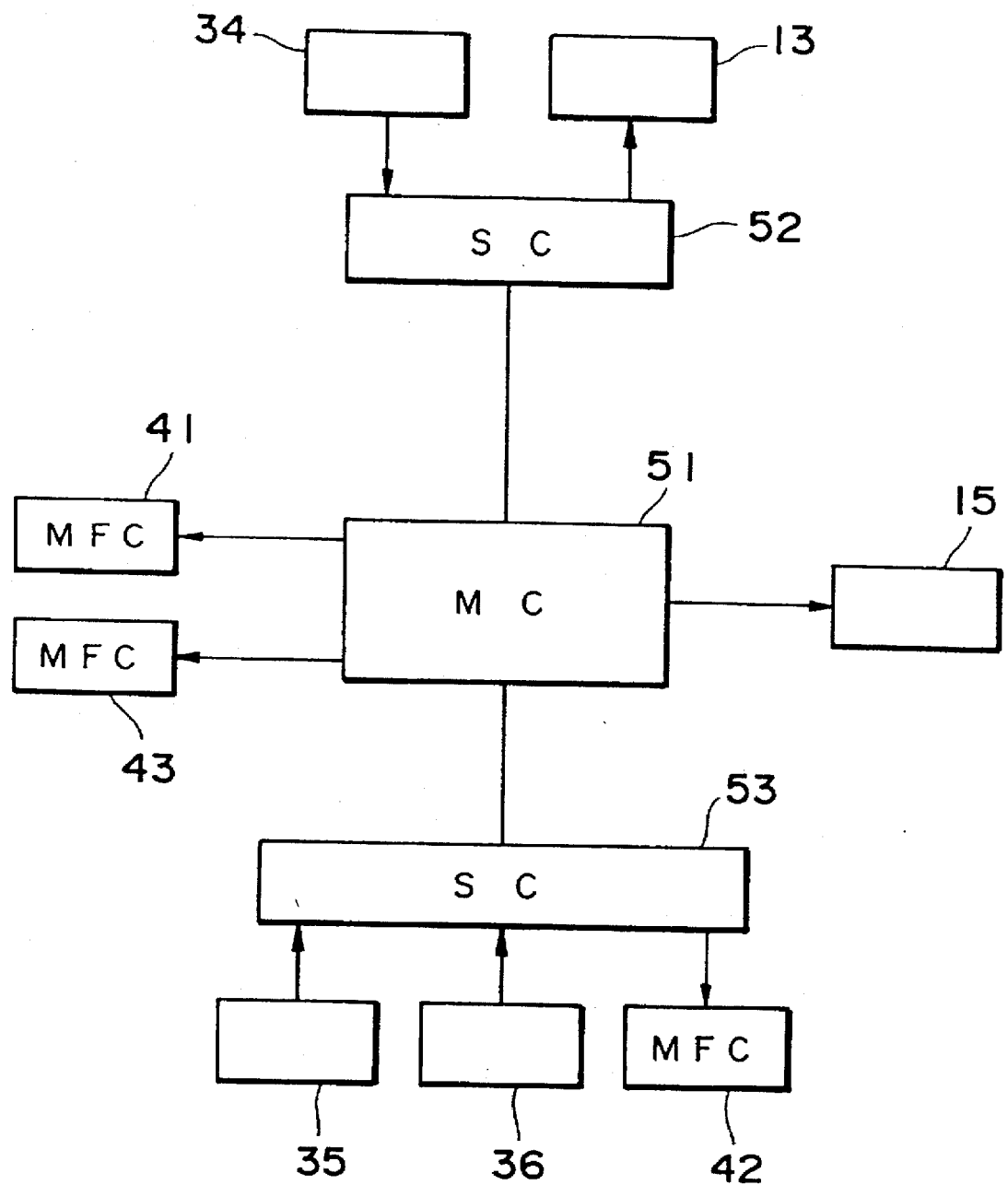
FIG. 2 is a block diagram of a control system of the apparatus in FIG. 1.

FIG. 2 is a block diagram of a control system of the manufacturing apparatus shown in FIG. 1. This system has a main controller (MC) 51 for performing the entire control, and two subcontrollers (SCs) 52 and 53. The main controller 51 controls the core formation MFC 41 and the cladding formation MFC 42, and also controls the start/end of rotation and the rotational speed of the seed rod 16 through the rotating device 15. The main controller 51 outputs a command to the subcontroller 52 to control the elevating device 13 in accordance with the detection result from the distal end detector 34 and move the support bar 14 upward such that the distal end of the growing porous glass preform 20 is always placed at the same position. The main controller 51 also outputs a command to the subcontroller 53 to control the MFC 42 such that the diameter reduction ratio of the porous core glass body 21 is set at a predetermined value. More specifically, a diameter reduction ratio $S=d/D$ is obtained from the measurement results D and d from the maximum and minimum diameter measurement devices 35 and 36, and the obtained value is compared with a set value to feedback-control the MFC 42, thereby controlling the output of an oxy-hydrogen flame from the auxiliary heating burner 33 such that the diameter reduction ratio is set at a predetermined value.

Figure 3:
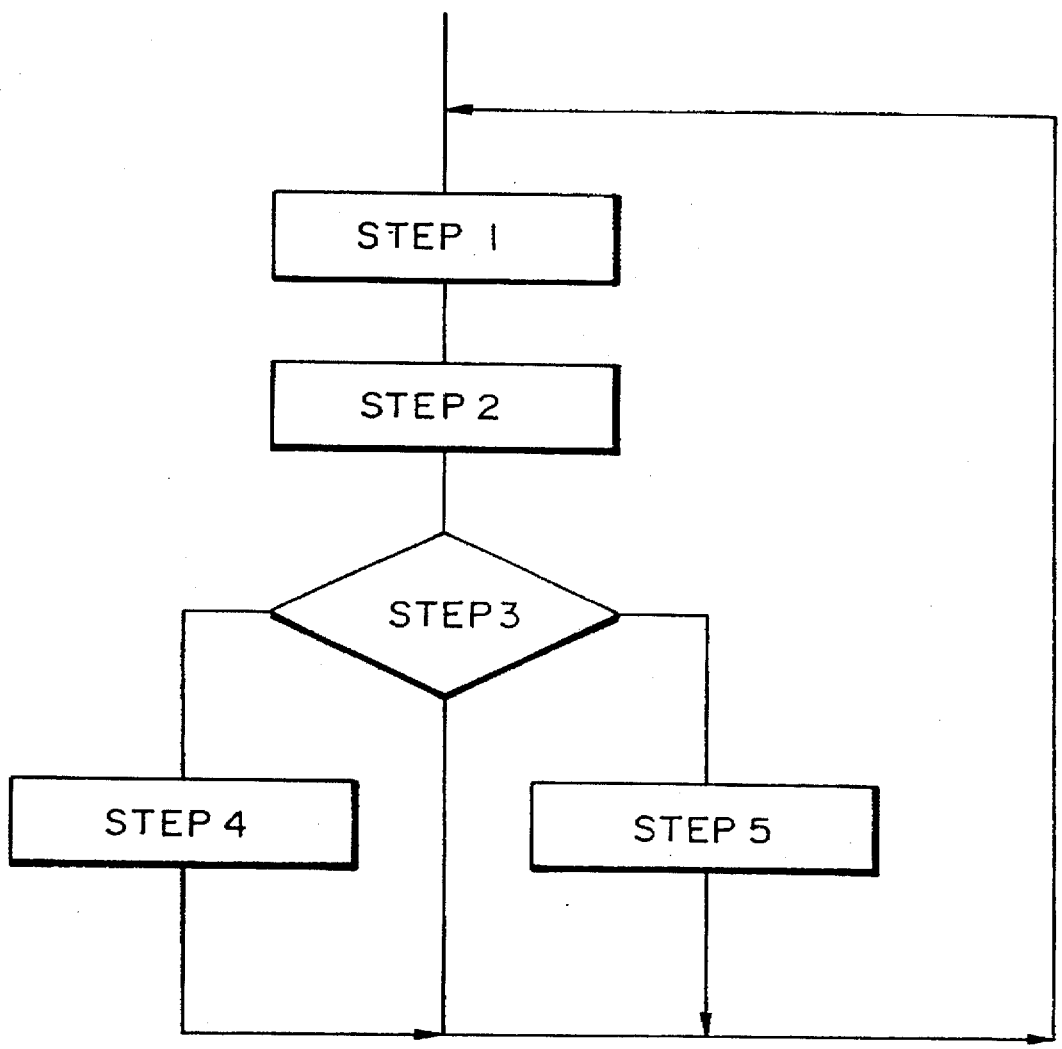
FIG. 3 is a flow chart showing the control of an auxiliary heating burner.

FIG. 3 is a flow chart for explaining the control for obtaining a predetermined diameter reduction ratio. First of all, the outer diameter D of the porous core glass body 21 before diameter reduction and the outer diameter d after diameter reduction are measured by the maximum and minimum diameter measurement devices 35 and 36 (step S1). The diameter reduction ratio S=d/D is calculated (step S2). The obtained diameter reduction ratio S=d/D is compared with a predetermined design value $S_o \pm \Delta S$ (step S3). If the measurement value S exceeds the design value $S_o + \Delta S$, the MFC 42 increases the flow rate of $H_2$ (hydrogen) by 10%, and this state is kept for ten minutes (step S4). On the other hand, if the measurement value S does not reach the design value $S_o - \Delta S$, the MFC 42 decreases the flow rate of $H_2$ (hydrogen) by 5%, and this state is kept for ten minutes (step S5). If the measurement value is within the range of design value $S_o \pm \Delta S$, this state is kept for ten minutes. After ten minutes, the same control starts from step S1 again.

Figure 4:
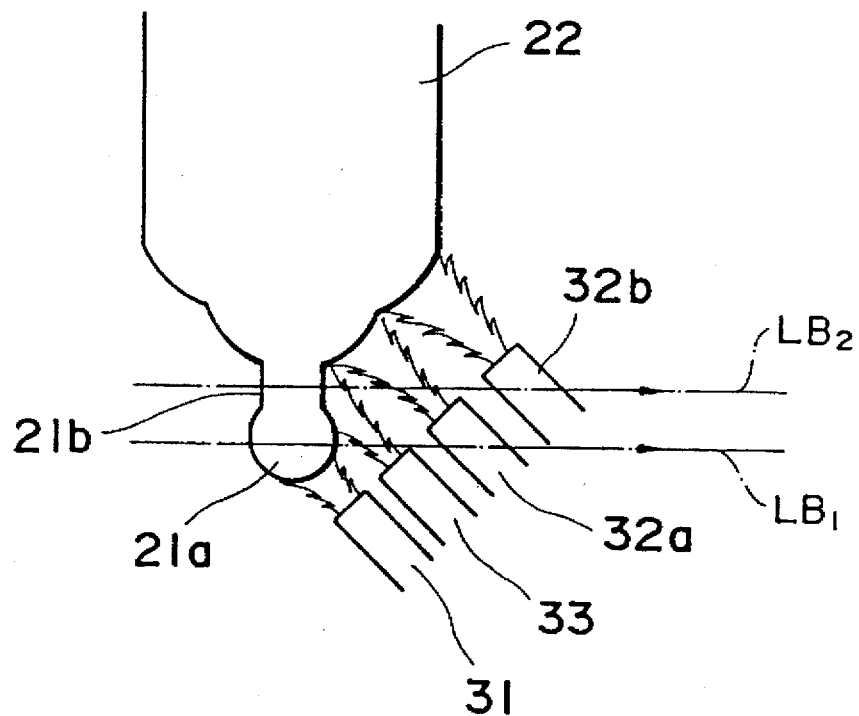
FIG. 4 is a side view showing a manufacturing process according to an experiment by the present inventors.
Figure 5:
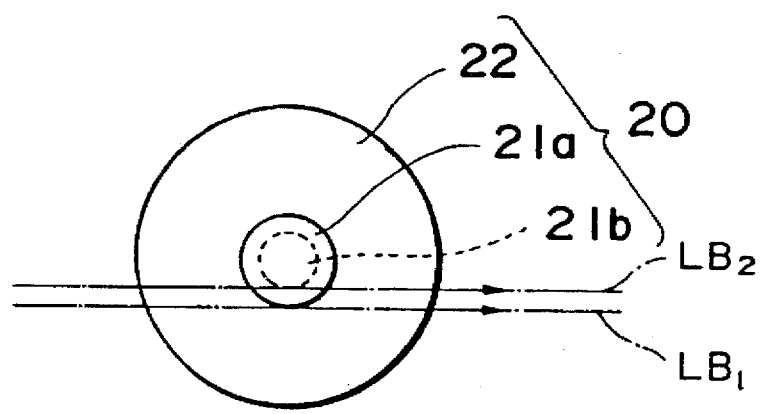
FIG. 5 is a bottom view of FIG. 4.

A manufacturing process used for an experiment by the present inventors will be described with reference to FIGS. 4 and 5. As shown in FIG. 4, the auxiliary heating burner 33 is provided between the core formation burner 31 and two cladding formation burners 32a and 32b. A laser beam $LB_1$ radiated from a laser source is received by a photosensor to measure the outer diameter of a porous core glass body 21a before diameter reduction. A laser beam $LB_2$ radiated from another laser source is received by another photosensor to measure the outer diameter of a porous core glass body 21b after diameter reduction. When $SiCl_4$ and $GeCl_4$ are supplied to the core formation burner 31, and $SICl_4$ is supplied to the inner and outer cladding formation burners 32a and 32b, hydrolytic reactions represented by the following formulas are performed.

$$SiCl_4 + 4H_2 + 2O_2 = SiO_2 + 2H_2O + 4HCl$$

$$GeCl_4 + 4H_2 + 2O_2 = GeO_2 + 2H_2O + 4HCl$$

Figure 6:
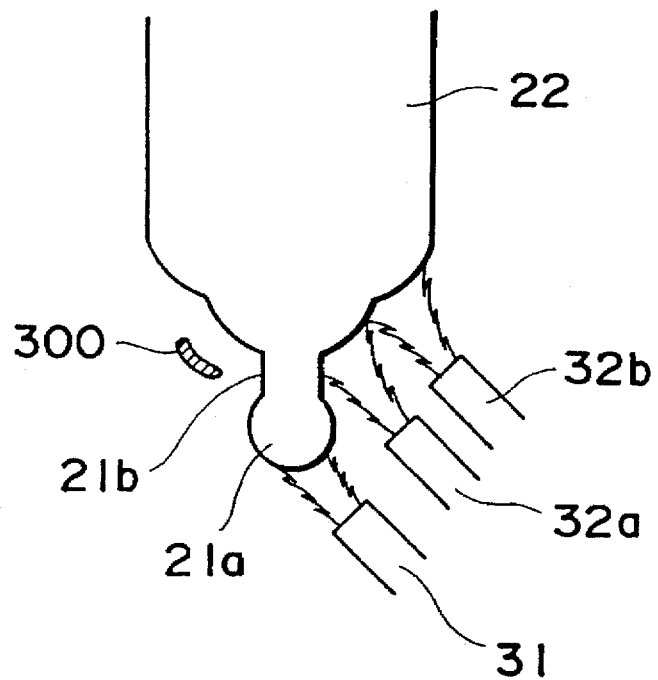
FIG. 6 is a side view showing another manufacturing process.
Figure 7:
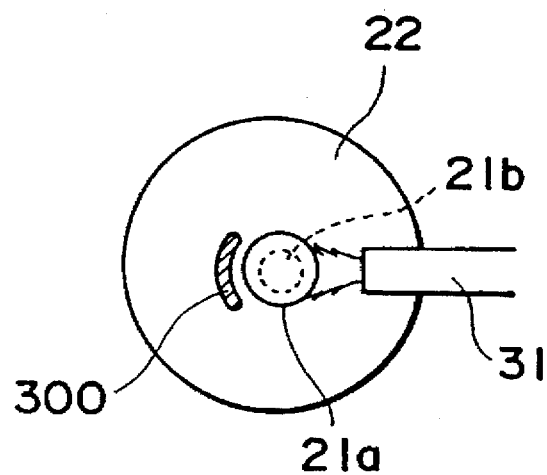
FIG. 7 is a bottom view of FIG. 6.

The porous core glass body 21a before diameter reduction, which is temporarily formed by the core formation burner 31, is exposed to the oxy-hydrogen flame from the auxiliary heating burner 33. When the surface is heated, the diameter is reduced. This diameter reduction is caused because the bulk density of the porous glass body on the surface of the porous core glass body 21 increases. The porous core glass body 21b after diameter reduction is exposed to a flame from the inner cladding formation burner 32a, which contains fine $SiO_2$ particles, and the inner layer of the porous cladding glass layer 22 is formed. The porous core glass body 21b is also exposed to a flame from the outer cladding formation burner 32b, which contains fine $SiO_2$ particles, and the outer layer of the porous cladding glass layer 22 is formed. Note that, in place of the auxiliary heating burner, a heater 300 for radiation heating by infrared radiation or the like may be provided at a position as shown in FIGS. 6 and 7. This heater 300 is provided at a position opposite to the burners 32a and 32b such that the preform 20 is inserted therebetween.

In the experiment, the present inventors formed the porous core glass body 21 having a diameter of 38 mm by the core formation burner 31, and the diameter was reduced using the auxiliary heating burner 33. The porous cladding glass layer 22 was then formed, thereby obtaining a porous optical fiber preform having a diameter of 150 mm. For example, when the diameter of 38 mm of glass body is reduced to 35 mm, the diameter reduction ratio is 0.92. At this time, the vitrified transparent fiber preform contained no bubble and exhibited a good tail sagging rate T/C of about 6%. The tail sagging rate T/C is defined by the rate of T (T is defined as an area of the portion denoted by "T" in FIG. 9B) to C (C is defined as an area of the portion denoted by "C" in FIG. 9B).

Figure 8A:
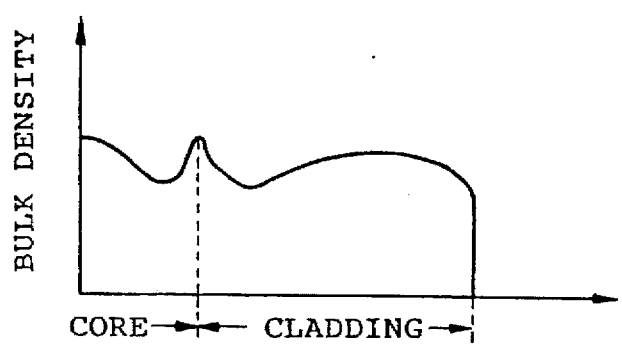
FIGS. 8A and 8E are graphs showing the relationship between the bulk density of a porous preform and the refractive index distribution of a spun optical fiber before diameter reduction is performed.
Figure 8B:
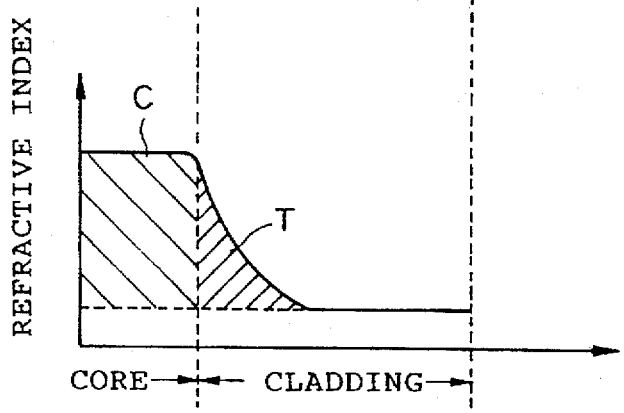
Figure 9A:
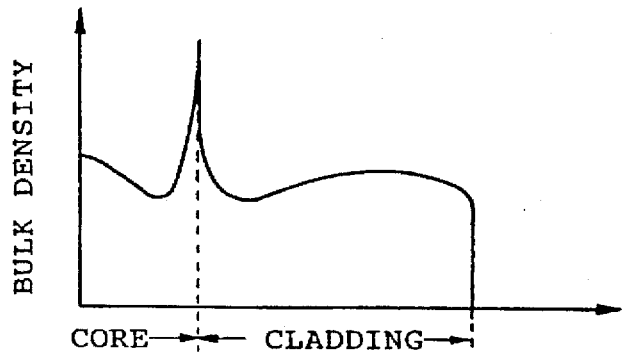
FIG. 9A and 9B are graphs showing the relationship between the bulk density of a porous preform and the refractive index distribution of a spun optical fiber after diameter reduction is performed.
Figure 9B:
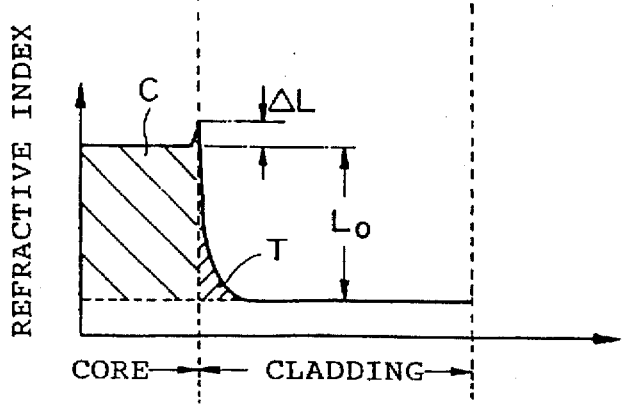

The relationship between the bulk density (g/cm³) distribution in the radial direction of the porous fiber preform 20 and the refractive index distribution of a spun optical fiber is shown in FIGS. 8A, 8B, 9A and 9B. FIGS. 8A and 8B are graphs obtained when diameter reduction by the auxiliary heating burner 33 is rarely performed or not performed at all. FIGS. 9A and 9B are graphs obtained when diameter reduction by the auxiliary heating burner 33 is performed. As shown in these Figures, as diameter reduction is more intensively performed, first, the peak value of the bulk density of the porous fiber preform 20 becomes larger, and second, the so-called tail sagging rate T/C in the optical fiber decreases. Reduction of the tail sagging rate T/C means that the graded index distribution is obtained at the interface between the core and the cladding, and so-called dispersion characteristics are improved. Third, as diameter reduction is more intensively performed, a so-called "spike" is formed at the interface between the core and the cladding of the optical fiber to increase the refractive index, as can be understood mainly from FIG. 9B.

According to the examination by the present inventors, as a ratio $\Delta L/L_0$ of a height $\Delta L$ of the refractive index of this "spike" to a height $L_0$ of the refractive index of the entire core increases, a deviation of the cutoff wavelength $\lambda c$ from the design value of the optical fiber increases. To qualitatively confirm this relationship, the present inventors conducted the following experiment.

The bulk density of the porous core glass body 21 of the porous fiber preform 20 before diameter reduction was set to 0.18, 0.20, 0.25, 0.28, and 0.30 g/cm³. The diameter reduction ratio by the auxiliary heating burner 33 was set to 0.98, 0.97, 0.95, 0.91, 0.90, 0.89, 0.85, and 0.80. In these conditions, the value $\Delta L/L_0$ ( % ) with respect to the height of the spike of the optical fiber and the deviation (µm) of the cutoff wavelength $\lambda c$ from the design value were measured. In FIGS. 10–13, the bulk density before diameter reduction (g/cm³) is identified as follows:

| | | |
|---|---|---|
| —△— | 0.30 | |
| —x— | 0.28 | BULK DENSITY BEFORE |
| —o— | 0.25 | DIAMETER REDUCTION |
| —+— | 0.20 | (g/cm³) |
| ——— | 0.18 | |

Figure 10:
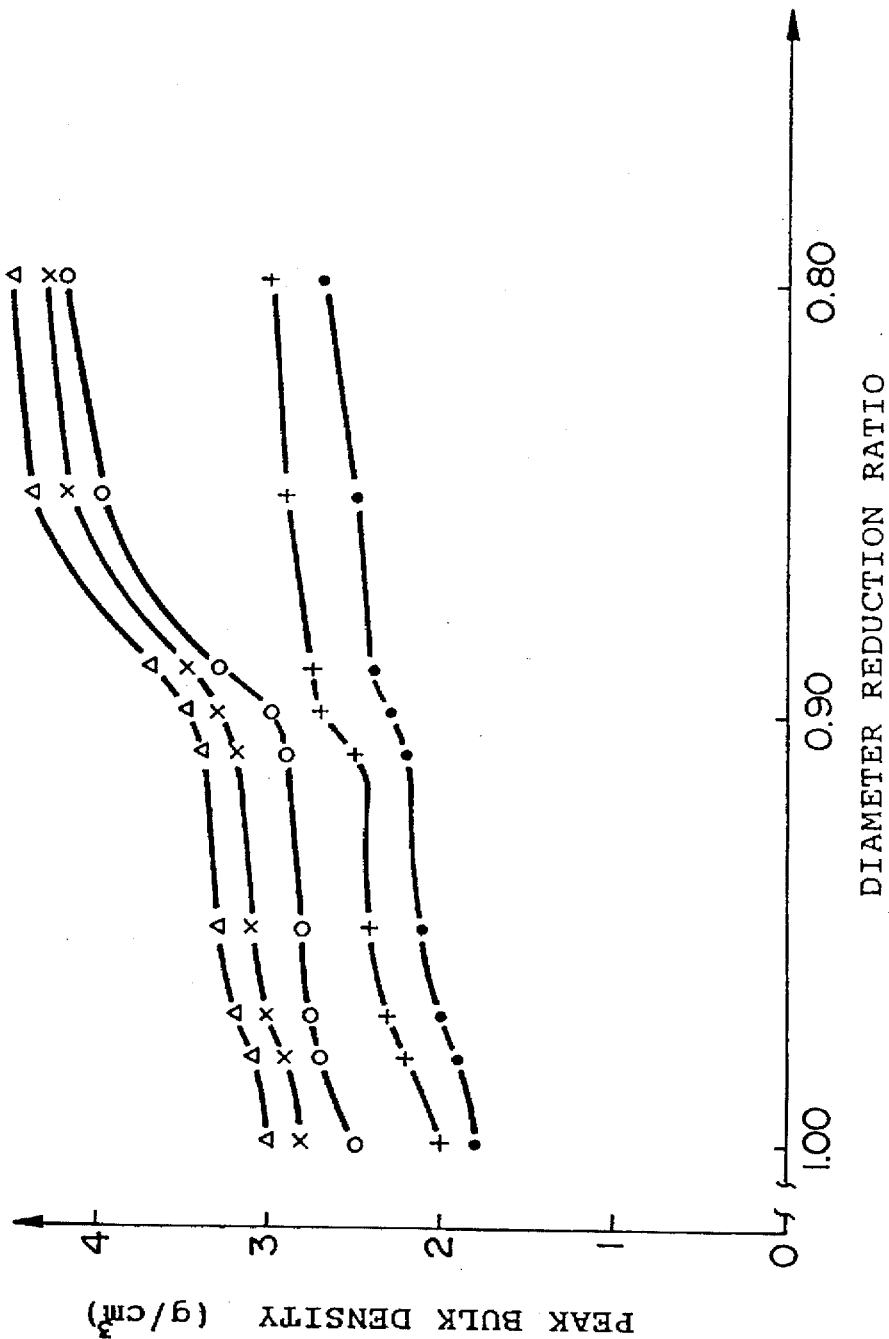
FIG. 10 is a graph showing the dependency of a peak bulk density on a diameter reduction ratio.
Figure 11:
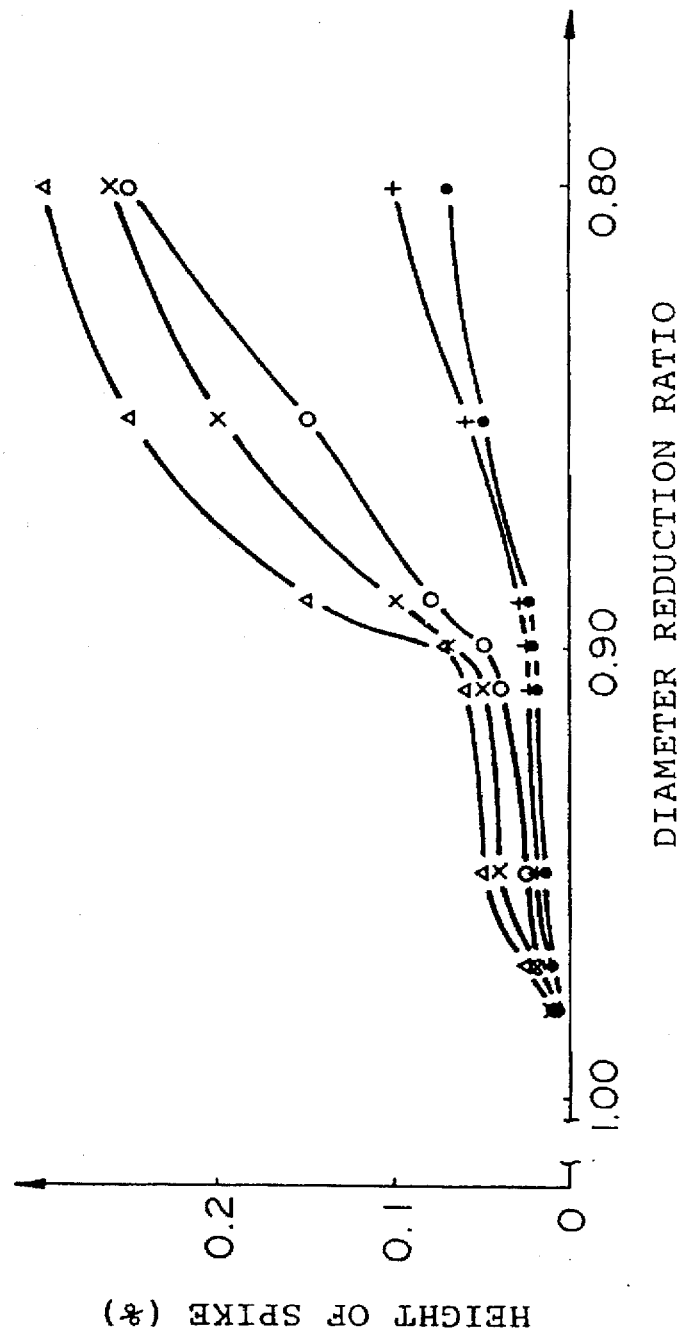
FIG. 11 is a graph showing the dependency of the height of a spike on the diameter reduction ratio.
Figure 12:
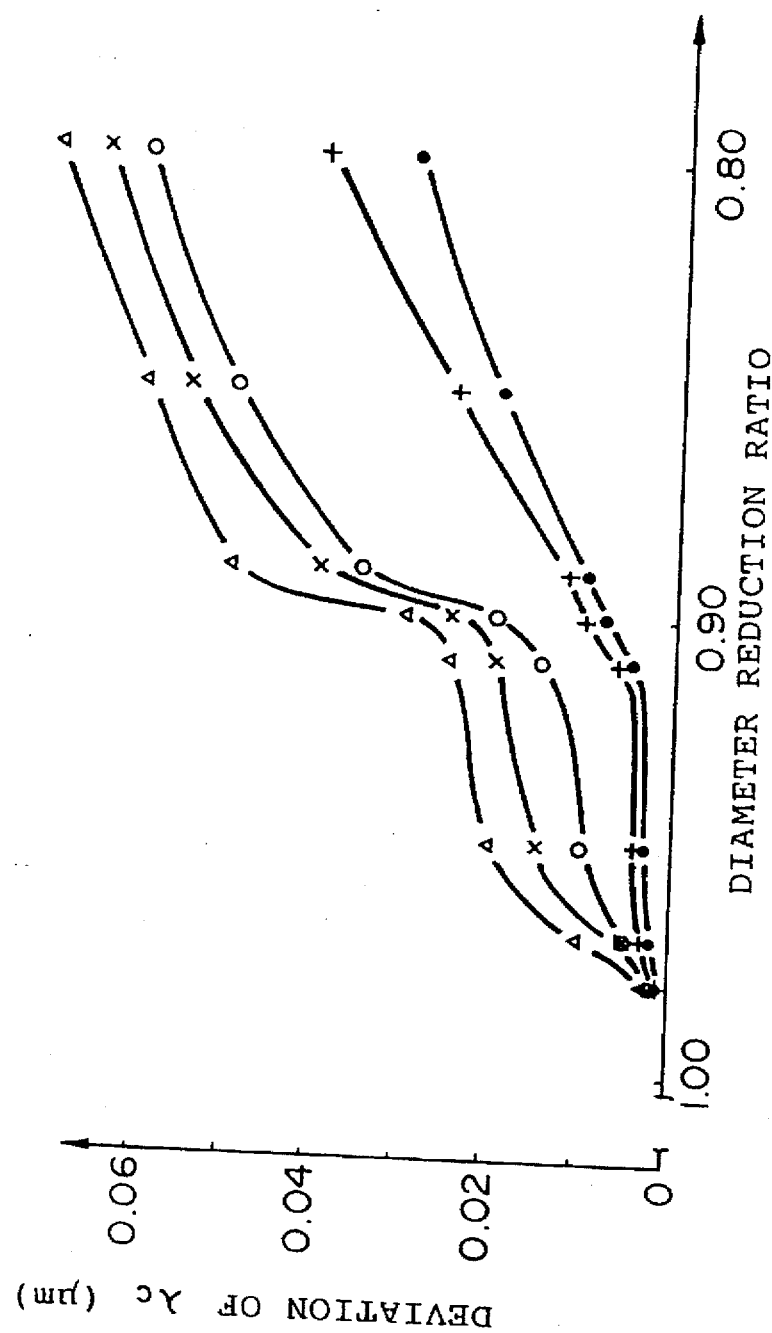
FIG. 12 is a graph showing the dependency of a deviation of a cutoff wavelength on the diameter reduction ratio.

FIG. 10 is a graph showing the peak bulk density (g/cm³) which changes according to the diameter reduction ratio. It can be understood that the dependency of the peak bulk density on the diameter reduction ratio largely changes from S=d/D=0.90. FIG. 11 represents that the height of the spike depends on the diameter reduction ratio, and FIG. 12 represents that the deviation of the cutoff wavelength $\lambda c$ from the design value depends on the diameter reduction ratio. The height of the spike and the deviation of the cutoff wavelength $\lambda c$ are correlated with each other, and this correlation is proved by FIG. 13. If the deviation of the cutoff wavelength $\lambda c$ from the design value is about 0.02 µm or less, there is no practical problem. As is apparent from FIG. 12, such an optical fiber can be realized at S=d/D=0.95 or more when the bulk density of the porous core glass body 21 before diameter reduction is 0.30 g/cm³, S=0.91 or more when the bulk density is 0.28 g/cm³, or S=0.85 or more when the bulk density is 0.18 g/cm³.

As described above, the relationship between the absolute value of deviation of the cutoff wavelength $\lambda c$ from the design value and the diameter reduction ratio changes depending on the bulk density of the porous core glass body 21 before diameter reduction. However, the dependency of the change in deviation value of the cutoff wavelength $\lambda c$ on the diameter reduction ratio when the diameter reduction ratio is 0.90 or less is typically different from that when the diameter reduction ratio is larger than 0.90. The present inventors found this rule in the extensive studies and experiments and completed the present invention. More specifically, the present inventors have reached a manufacturing method in which the porous core glass body is heated by the auxiliary heating burner 33 to obtain a diameter reduction ratio larger than 0.90, thereby minimizing the deviation of the cutoff wavelength $\lambda c$ from the design value. When the diameter reduction ratio exceeds 0.98, a graded index core can hardly be obtained. For this reason, the diameter reduction ratio is preferably 0.98 or less.

As shown in FIGS. 10 to 12, when the bulk density of the porous core glass body 21 before diameter reduction exceeds 0.25 g/cm$^3$, the dependency of the deviation of the cutoff wavelength $\lambda c$ on the diameter reduction when the diameter reduction ratio is less than 0.90 is largely different from that when the diameter reduction ratio is larger than 0.90. Therefore, when a large vitrified transparent optical fiber preform is to be manufactured to spin a longer optical fiber, it is particularly required to set the diameter reduction ratio to a value larger than 0.90 as in the present invention. This is because the bulk density of the porous fiber preform 20 is preferably increased in advance when a large, i.e., long transparent glass preform is to be manufactured without changing the size of the furnace, i.e., the muffle 11 in FIG. 1, for forming the porous fiber preform 20.

According to a method of manufacturing a single-mode optical fiber preform, a graded index core is obtained to improve dispersion characteristics while an optical fiber which minimizes the deviation of the cutoff wavelength $\lambda c$ from the design value can be realized with a high yield. Therefore, this method is appropriately used to manufacture an optical fiber which requires strict specifications.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a single-mode optical fiber preform comprising:

a first step of depositing fine SiO$_2$ particles and fine GeO$_2$ particles to grow a porous core glass body from a distal end of a rotating starting rod in an axial direction by using a core formation burner;

a second step of heating a portion of said grown porous core with heating means to perform diameter reduction by increasing a bulk density of said portion of said grown porous core while growing said porous core glass body; and a third step of depositing fine SiO$_2$ particles produced to form a porous cladding glass layer on an outer surface of said diameter-reduced porous core glass body by a cladding formation burner while performing growing and diameter reduction of said porous core glass body, wherein an outer diameter of said porous core glass body after the third step of depositing is larger than 0.90 times an outer diameter before diameter reduction.

2. A method according to claim 1, wherein said heating means comprises a burner which is provided between said core formation burner and said cladding formation burner and heats said porous core glass body by an oxy-hydrogen flame.

3. A method according to claim 1, wherein the outer diameter of said porous core glass body after the second step of performing diameter reduction is not more than 0.98 times the outer diameter before diameter reduction.

4. A method according to claim 1, wherein the first step comprises a fourth step of measuring the outer diameter of said porous core glass body before diameter reduction while growing said porous core glass body, the second step comprises a fifth step of measuring the outer diameter of diameter-reduced said porous core glass body while performing diameter reduction of said porous core glass body, and heat treatment by said heating means is controlled such that the measured outer diameter after diameter reduction is larger than 0.90 times the outer diameter before diameter reduction.

* * * * *